US 6,705,438 B2

(12) United States Patent
Ananthanarayanan et al.

(10) Patent No.: US 6,705,438 B2
(45) Date of Patent: Mar. 16, 2004

(54) METHOD FOR ATTACHING RING TO DAMPER BASE CUP AND DAMPER HAVING RING

(75) Inventors: Venkatasubramanian Ananthanarayanan, Beavercreek, OH (US); Steven Paul Donahue, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 27 days.

(21) Appl. No.: 09/903,422

(22) Filed: Jul. 11, 2001

(65) Prior Publication Data

US 2003/0020222 A1 Jan. 30, 2003

(51) Int. Cl.⁷ .................................................. F16F 9/00
(52) U.S. Cl. .................................. 188/321.11; 267/217
(58) Field of Search ....................... 188/321.11, 322.17, 188/322.19; 267/217; 219/58, 67, 121.11, 121.12, 121.13, 121.14, 121.63, 121.64, 121.6, 101, 104, 107; 403/270, 271, 309, 313, 314, 385; 228/196, 197; 29/888.044

(56) References Cited

U.S. PATENT DOCUMENTS 2,106,272 A * 1/1938 Elsey .......................... 219/107
3,503,474 A * 3/1970 Raab ....................... 188/321.11
4,408,112 A * 10/1983 Kazlauskas ................... 219/61
5,896,960 A * 4/1999 Ananthanarayanan .. 188/321.11
6,370,740 B1 * 4/2002 Foreman ..................... 403/385

FOREIGN PATENT DOCUMENTS

DE           42 09 218 A1  * 11/1993    ............ 188/321.11
EP           0 884 501 A1  * 12/1998

OTHER PUBLICATIONS

Resistance Welding, Encyclopeadia Britannica Online.*

* cited by examiner

Primary Examiner—Jack Lavinder
Assistant Examiner—Thomas Williams
(74) Attorney, Agent, or Firm—Scott A. McBain

(57) ABSTRACT

A damper, such as a vehicle shock absorber, and a method for attaching a ring to a base cup of a damper. The method includes the step of autogenously welding the ring to the damper base cup. The damper includes a ring autogenously welded to the damper base cup. In one variation, the ring is continuous and the base cup has a substantially convex surface with an outward projection. In another variation, the ring is split and has an end portion having a tab which projects radially outward. In one implementation, the welding consists essentially of drawn arc welding.

7 Claims, 6 Drawing Sheets

METHOD FOR ATTACHING RING TO DAMPER BASE CUP AND DAMPER HAVING RING

TECHNICAL FIELD

The present invention relates generally to dampers, and more particularly to a method for attaching a ring to a damper base cup and to a damper having a ring.

BACKGROUND OF THE INVENTION

Conventional dampers include dampers, such as conventional vehicle shock absorbers, having a cylinder containing a damping fluid (such as oil) and having a damper piston assembly including a piston which slideably engages the cylinder. The fluid passes through an orifice of a valve assembly of the piston. A piston rod has a first end attached to the piston and a second end extending outside the cylinder. The cylinder and the rod are attached to separate structures to dampen relative motion of the two structures along the direction of piston travel. Typically, a base cup is attached to the cylinder, and a circular, continuous or split ring is resistance spot welded, without using filler material, to the convex surface of the base cup and/or is gas-metal arc welded, using filler material, with two side welds to the convex surface of the base cup. One of the two structures is attached to the cylinder through the ring.

Using only the resistance spot weld to attach the ring to the base cup results in high fatigue stress mainly due to the limited weld bond area, especially when side loads are involved. Using only the two gas-metal side arc welds creates the problem of having a filler-material weld bead laid on a large root gap leading to variable fatigue life. Also, if both side welds are made at the same time, their cooling stresses add up and solidification stresses are high. If the side welds are made one after another, the Takt time (i.e., the time from the start of making a first part to the start of making a second part) is high as the part needs to be fixtured while the first weld cools in order to minimize distortion of the cup-ring assembly. If both a resistance spot weld and the side welds are used, this adds to the cost and the Takt time of joining the base cup to the ring. When a continuous ring (such as a seamless ring) is used, it is more expensive then to use a split ring. When a conventional split ring (such as a less expensive split ring formed from sheet metal) is used, it looks like a continuous ring which has a cut, and it is difficult to reliably locate the cut at the weld area leading to a rejected part.

What is needed is an improved method for attaching a ring to a damper base cup and an improved damper having a ring.

SUMMARY OF THE INVENTION

A first method of the invention is for attaching a split ring to a base cup of a cylinder of a damper and includes steps a) through d). Step a) includes obtaining a generally-circular split ring having a center and having opposing first and second end portions, wherein the first end portion has a first tab which projects radially outward. Step b) includes positioning the split ring proximate the base cup. Step c) includes aligning the tab to project toward the base cup. Step d) includes autogenously welding the split ring to the base cup creating a weld bond area which includes at least a portion of the first tab and at least a part of the second end portion.

A second method of the invention is for attaching a continuous ring to a damper base cup and includes steps a) through d). Step a) includes obtaining a damper base cup having a substantially convex surface, wherein the substantially convex surface has a first outward projection. Step b) includes positioning the continuous ring proximate the base cup. Step c) includes aligning the first outward projection toward the continuous ring. Step d) includes autogenously welding the continuous ring to the base cup creating a weld bond area which includes at least a portion of the first outward projection.

A third method of the invention is for attaching a continuous ring to a damper base cup and includes steps a) and b). Step a) includes locating the continuous ring proximate the base cup. Step b) includes autogenously welding the continuous ring to the base cup.

In a first embodiment of the invention, a damper includes a damper cylinder, a base cup attached to the damper cylinder; and a generally-circular split ring. The split ring has a center and has opposing first and second end portions. The first end portion has a first tab which projects radially outward. The split ring is autogenously welded to the base cup creating a weld bond area which includes at least a portion of the first tab and at least a part of the second end portion.

In a first expression of a second embodiment of the invention, a damper includes a damper cylinder, a base cup attached to the damper cylinder, and a continuous ring. The base cup has a substantially convex surface, wherein the substantially convex surface has a first outward projection. The continuous ring is autogenously welded to the base cup creating a weld bond area which includes at least a portion of the first outward projection.

In a second expression of a second embodiment of the invention, a damper includes a damper cylinder, a base cup attached to the damper cylinder, and a continuous ring autogenously welded to the base cup.

Several benefits and advantages are derived from the invention. In the method and damper embodiment of the invention having the split ring with the projecting tab, an inexpensive split ring is used, the tab is easily located at the weld area, and only one weld operation is used wherein the tab creates a larger weld bond area providing improved fatigue life. In the method and damper embodiment and expression of the invention having the continuous ring and having the base cup with an outward projection, only one weld operation is used wherein the outward projection creates a larger weld bond area providing improved fatigue life. In the method and damper embodiment and expression of the invention having the continuous ring, with or without an outward projection, only one weld operation having a larger weld bond area is used which provides improved fatigue life.

DESCRIPTION OF THE PREFERRED EMBODIMENTS

Figures 1, 6:
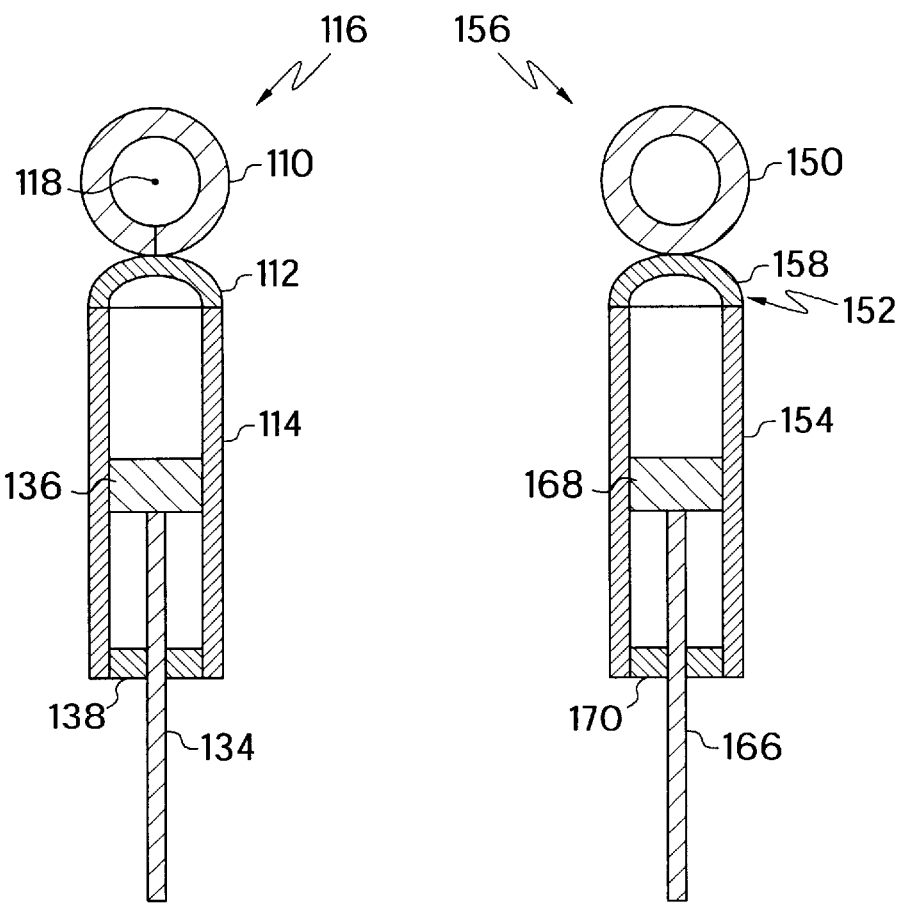
FIG. 1 is a schematic, side cross-sectional view of a first embodiment of a damper of the invention including a split ring, wherein the weld bond area has been omitted for clarity.
FIG. 6 is a schematic, side cross-sectional view of a second embodiment of a damper of the invention including a continuous ring, wherein the weld bond area has been omitted for clarity.
Figure 2:
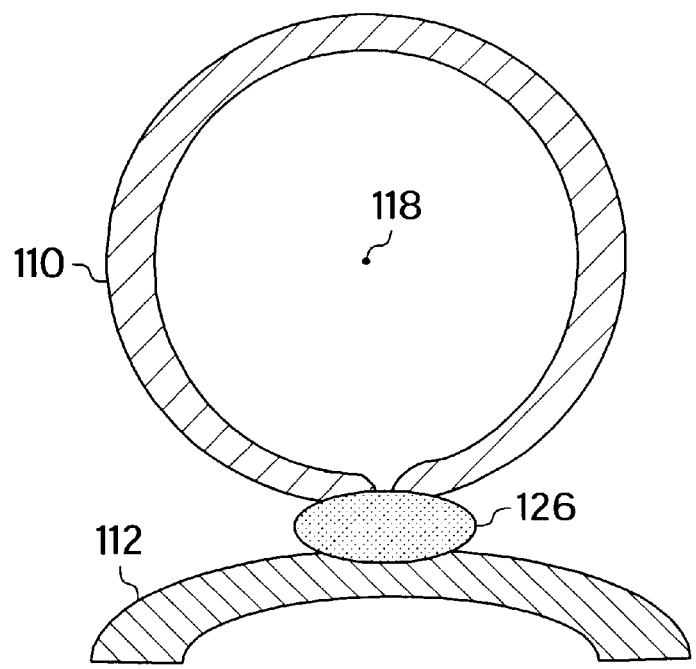
FIG. 2 is an enlarged view of the base cup and the ring of the damper of FIG. 1 showing the weld bond area.
Figure 3:
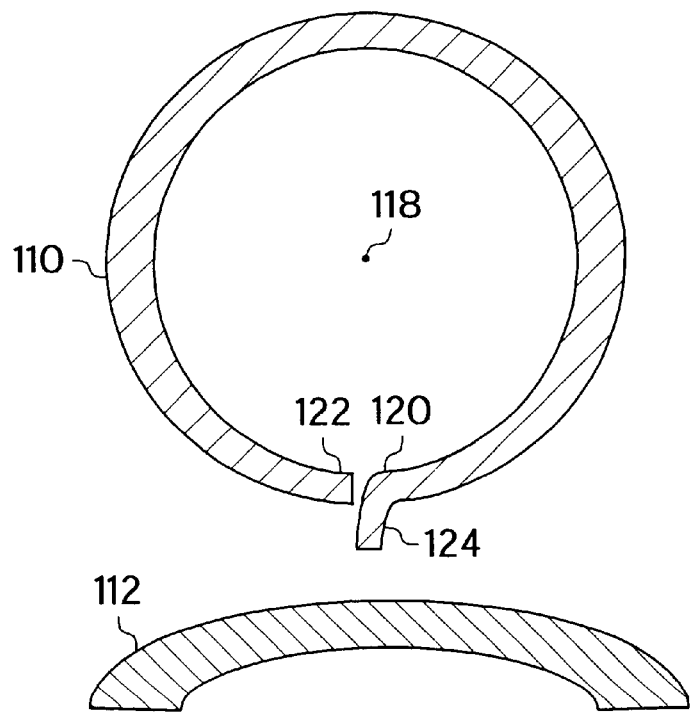
FIG. 3 is a view, as in FIG. 2, of the base cup and a first embodiment of the split ring before the split ring has been autogenously welded to the base cup.

Referring to FIGS. 1–3, wherein like numerals represent like elements throughout, a first method of the invention is for attaching a split ring 110 to a base cup 112 of a cylinder 114 of a damper 116 and comprises steps a) through d). Step a) includes obtaining a generally-circular split ring 110 having a center 118 and having opposing first and second end portions 120 and 122, wherein the first end portion 120 has a first tab 124 which projects radially outward. Step b) includes disposing the split ring 110 proximate the base cup 112. Step c) includes aligning the first tab 124 to project toward the base cup 112. In one example, the first tab 124 is aligned to project toward the center of the base cup 112. Step d) includes autogenously welding the split ring 110 to the base cup 112 creating a weld bond area 126 which includes at least a portion of the first tab 124 and at least a part of the second end portion 122. Autogenous welding does not use filler material, as is understood by the artisan.

Figure 4:
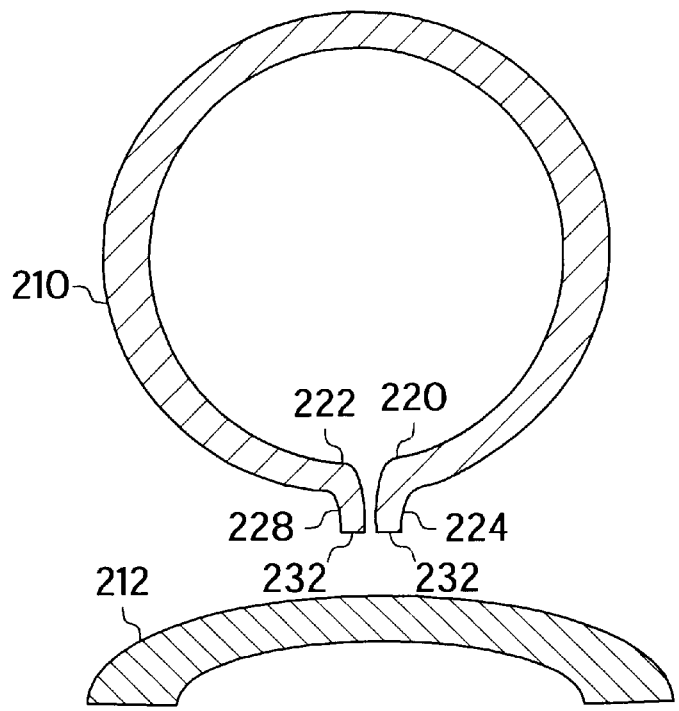
FIG. 4 is a view, as in FIG. 3, but including a second embodiment of the split ring.
Figure 5:
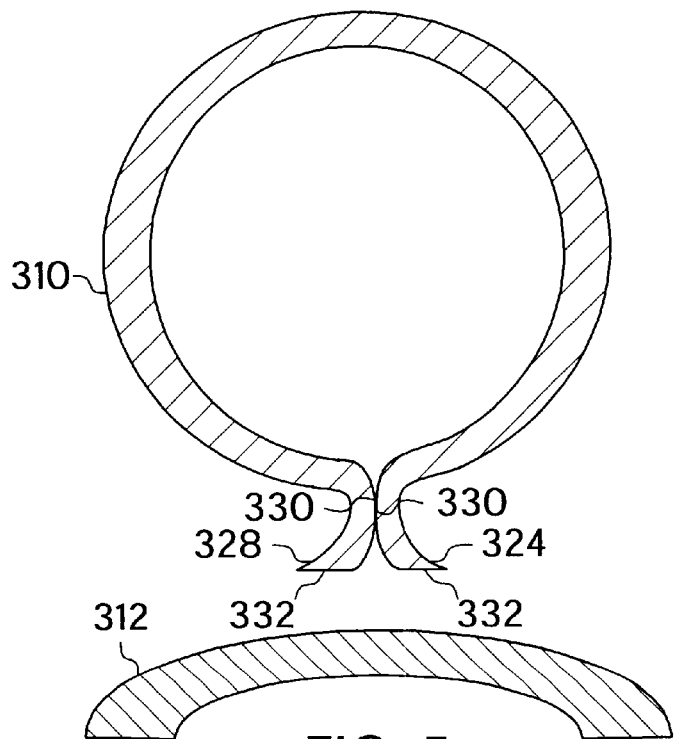
FIG. 5 is a view, as in FIG. 3, but including a third embodiment of the split ring.

In one implementation of the first method, referring to FIG. 4, the second end portion of the split ring 210 has a second tab 228 which projects radially outward, and the weld bond area includes at least a portion of the second tab 228. In one example, the second end portion 222 of the split ring 210 is substantially a mirror image of the first end portion 220 of the split ring 210. In one variation, as seen in FIG. 5, the first and second tabs 324 and 328 each project radially outward and have a radially inner portion 330 and a radially outer end 332. The radially outer ends 332 are tangentially spaced further apart than are the radially inner portions 330. In one example, the radially inner portions 330 of the first and second tabs 324 and 328 abut each other.

In the same or another implementation of the first method, the welding consists essentially of drawn arc welding. Drawn arc welding of two parts is well understood by the artisan. Other types of welding suitable for autogenous welding for any of the methods of the invention include, without limitation, friction, laser, electron beam or resistance welding. In one application of the first method, the damper 116 is a vehicle shock absorber.

Referring again to FIGS. 1–3, a first embodiment of the invention is a damper 116 having a damper cylinder 114, a base cup 112 attached (such as by a weld) to the damper cylinder 114, and a generally-circular split ring 110. The split ring 110 has a center 118 and has opposing first and second end portions 120 and 122. The first end portion 120 has a first tab 124 which projects radially outward. The split ring 110 is autogenously welded to the base cup 112 creating a weld bond area 126 which includes at least a portion of the first tab 124 and at least a part of the second end portion 122.

In one design of the first embodiment, referring to FIG. 4, the base cup 212 is shown, the second end portion 222 of the split ring 210 has a first tab 224 and a second tab 228 which project radially outward, and the weld bond area includes at least a portion of the first tab 224 and at least a portion of the second tab 228. In one example, the second end portion 222 of the split ring 210 is substantially a mirror image of the first end portion 220 of the split ring 210. In one variation, as seen in FIG. 5, the base cup 312 is shown, and the first and second tabs 324 and 328 each project radially outward and have a radially inner portion 330 and a radially outer end 332. The radially outer ends 332 are tangentially spaced further apart than are the radially inner portions 330. On one example, the radially inner portions 330 of the first and second tabs 324 and 328 abut each other. Applicants successfully performed welding experiments including an experiment where the tabs of the end portions of the split ring projected radially outward generally 2 to 3 millimeters, wherein the tabs were melted down during welding. When the radially outer ends of the tabs had an overhang width of generally 8 to 10 millimeters, a weld area of generally 12 to 14 millimeters was achieved.

In the same or another design of the first embodiment, the split ring 110 is drawn-arc welded to the base cup 112. In one application of the first embodiment, the damper cylinder 114 is a vehicle shock-absorber cylinder. In one example, as seen in FIG. 1, the damper 116 also includes a piston rod 134, a piston 136, and a cylinder end cap 138. In this example, the piston 136 is disposed in the cylinder 114, the piston rod 134 is slideably engaged in an aperture of the cylinder end cap 138, and the piston rod 134 has a first end attached to the piston 136 and has a second end disposed outside the cylinder 114. It is noted that damping fluid has been omitted from FIG. 1 for clarity.

Figure 7:
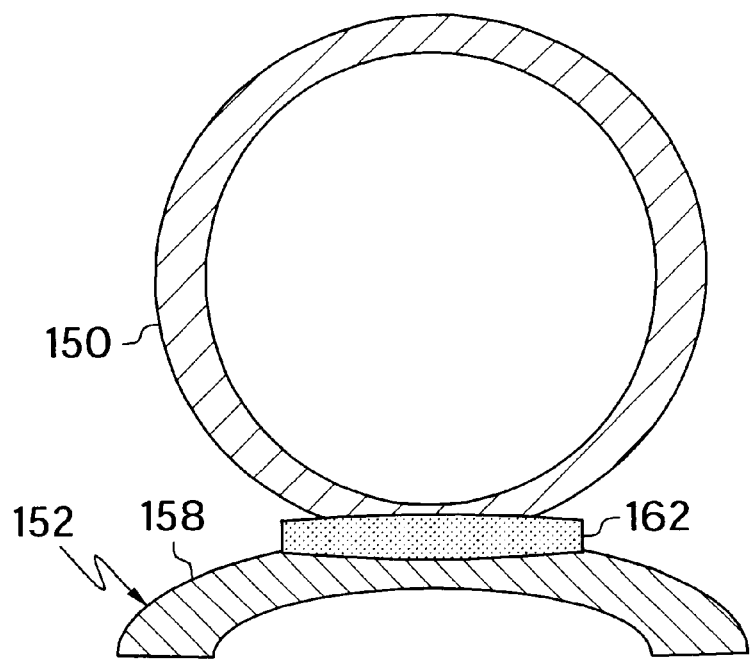
FIG. 7 is an enlarged view of the base cup and the ring of the damper of FIG. 6 showing the weld bond area.
Figure 8:
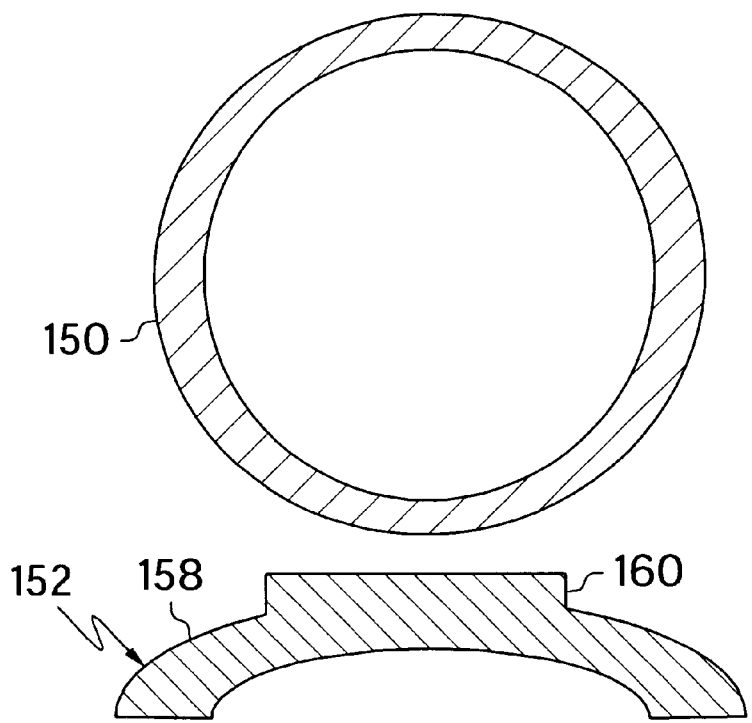
FIG. 8 is a view, as in FIG. 7, of the ring and a first embodiment of the base cup before the continuous ring has been autogenously welded to the base cup.

Referring to FIGS. 6–8, a second method of the invention is for attaching a continuous ring 150 to a base cup 152 of a cylinder 154 of a damper 156 and comprises steps a) through d). Step a) includes obtaining a damper base cup 152 having a substantially convex surface 158, wherein the substantially convex surface 158 has a first outward projection 160. Step b) includes disposing the continuous ring 150 proximate the base cup 152. Step c) includes aligning the first outward projection 160 toward the continuous ring 150. Step d) includes autogenously welding the continuous ring 150 to the base cup 152 creating a weld bond area 162 which includes at least a portion of the first outward projection 160.

Figure 9:
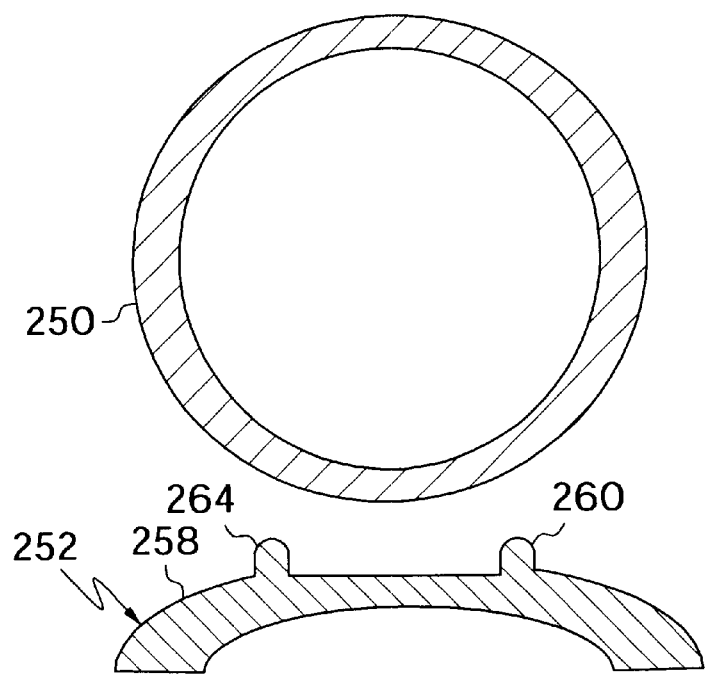
FIG. 9 is a view, as in FIG. 8, but including a second embodiment of the base cup.
Figure 10:
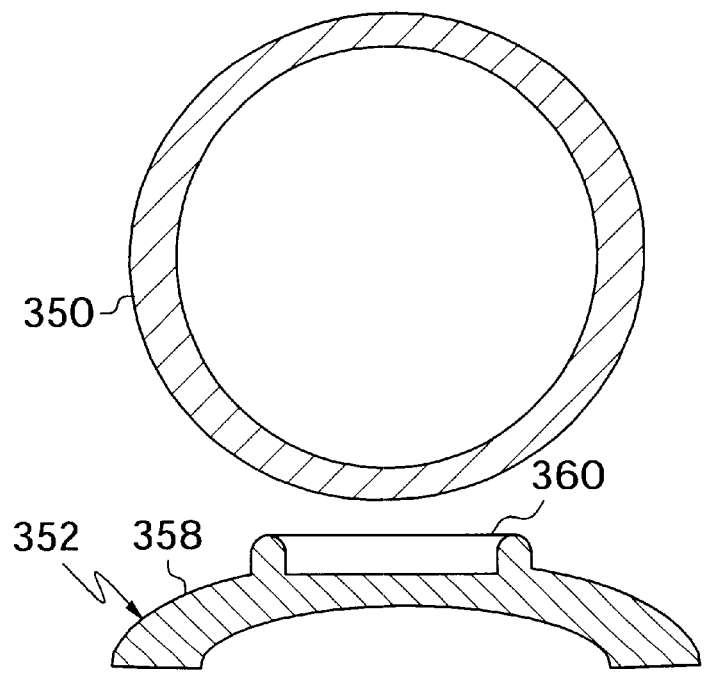
FIG. 10 is a view, as in FIG. 8, but including a third embodiment of the base cup.

In one implementation of the second method, referring to FIG. 9, the substantially convex surface 258 has a second outward projection 264 spaced apart from the first outward projection 260, wherein the aligning step also aligns the second outward projection 260 toward the continuous ring 250, and wherein the weld bond area includes at least a portion of the second outward projection 264. In another implementation of the second method, as seen in FIG. 10, the first outward projection 360 is an annular projection.

Referring again to FIGS. 6–8, a first expression of the second embodiment of the invention is a damper 156 having a damper cylinder 154, a base cup 152, and a continuous ring 150. The base cup 152 is attached (such as by a weld) to the damper cylinder 154 and has a substantially convex surface 158. The substantially convex surface 158 has a first outward projection 160. The continuous ring 150 is autogenously welded to the base cup 152 creating a weld bond area 162 which includes at least a portion of the first outward projection 160.

In one design of the first expression of the second embodiment, referring to FIG. 9, the substantially convex surface 258 of the base cup 252 has a second outward projection 264 spaced apart from the first outward projection 260, and the weld bond area includes at least a portion of the second outward projection 264. In another design of the second expression of the second embodiment, as seen in FIG. 10 (which also shows the continuous ring 350, the first outward projection 360 of the convex surface 358 of the base cup 352 is an annular projection.

In one example, as seen in FIG. 6, the damper 156 also includes a piston rod 166, a piston 168, and a cylinder end cap 170. In this example, the piston 168 is disposed in the cylinder 154, the piston rod 166 is slideably engaged in an aperture of the cylinder end cap 170, and the piston rod 166 has a first end attached to the piston 168 and has a second end disposed outside the cylinder 154. It is noted that damping fluid has been omitted from FIG. 6 for clarity.

Figure 11:
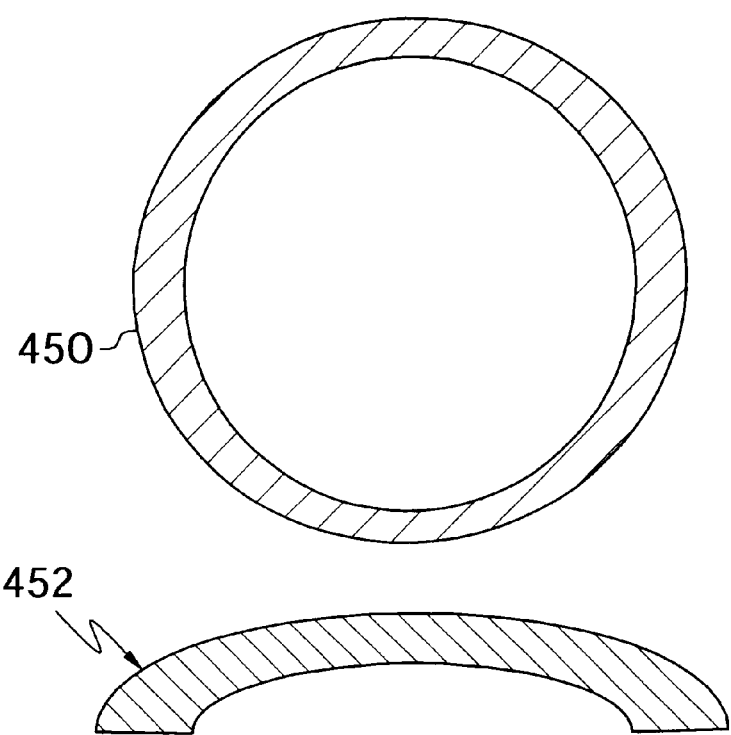
FIG. 11 is a view, as in FIG. 8, but including a fourth embodiment of the base cup.

A third method of the invention, as seen from FIGS. 6–8, is for attaching a continuous ring 150 to a damper base cup 152 and includes steps a) and b). Step a) includes disposing the continuous ring 150 proximate the base cup 152. Step b) includes autogenously welding the continuous ring 150 to the base cup 152. An example of an alternate embodiment of the damper base cup 452 of the third method is shown in FIG. 11. In one implementation of the third method, the welding consists essentially of drawn arc welding.

A second expression of the second embodiment of the invention is a damper 156 including a damper cylinder 154, a base cup 152 attached (such as by a weld) to the damper cylinder 154, and a continuous ring 150 autogenously welded to the base cup 152. An example of an alternate embodiment of the damper base cup 452 of the third method is shown in FIG. 11 (which also shows the continuous ring 450. In one design, the continuous ring 450 is drawn-arc welded to the base cup 452.

In one application, the damper of any of the methods, embodiments and expressions of the invention is a shock absorber such as a shock absorber for an automobile, an airplane, or other type of vehicle. Another application is use of the damper to provide motion resistance on exercise equipment such as stair climbers and rowing machines. A further application is use of the damper to provide motion isolation for a building, bridge, or other structure subject to earthquakes. An additional application is use of the damper to dampen vibrations encountered by vehicles and structures in outer space. Other applications are left to the artisan.

Several benefits and advantages are derived from the invention. In the method and damper embodiment of the invention having the split ring with the projecting tab, an inexpensive split ring is used, the tab is easily located at the weld area, and only one weld operation is used wherein the tab creates a larger weld bond area providing improved fatigue life. In the method and damper embodiment and expression of the invention having the continuous ring and having the base cup with an outward projection, only one weld operation is used wherein the outward projection creates a larger weld bond area providing improved fatigue life. In the method and damper embodiment and expression of the invention having the continuous ring, with or without an outward projection, only one weld operation having a larger weld bond area is used which provides improved fatigue life.

The foregoing description of a several expressions and embodiments and methods of the invention has been presented for purposes of illustration. It is not intended to be exhaustive or to limit the invention to the precise procedure or precise form disclosed, and obviously many modifications and variations are possible in light of the above teaching. It is intended that the scope of the invention be defined by the claims appended hereto.

What is claimed is:

1. A method for attaching a split ring to a base cup of a cylinder of a damper comprising the steps of:

a) obtaining a nonarticulated and generally-circular split ring having a center and having opposing first and second end portions, wherein the first end portion has a first tab which projects radially outward;

b) disposing the split ring proximate the base cup;

c) aligning the tab to project toward the base cup; and d) autogenously welding the split ring to the base cup creating a weld bond area which includes at least a portion of the first tab and at least a part of the second end portion.

2. The method of claim 1, wherein the second end portion of the split ring has a second tab which projects radially outward, and wherein the weld bond area includes at least a portion of the second tab.

3. The method of claim 2, wherein the second end portion of the split ring is substantially a mirror image of the first end portion of the split ring.

4. The method of claim 2, wherein the first and second tabs each have a radially inner portion and a radially outer end, and wherein the radially outer ends are tangentially spaced further apart than are the radially inner portions.

5. The method of claim 4, wherein the radially inner portions of the first and second tabs abut each other.

6. The method of claim 1, wherein the welding consists essentially of drawn arc welding.

7. The method of claim 1, wherein the damper is a vehicle shock absorber.

* * * * *